Figure 1:
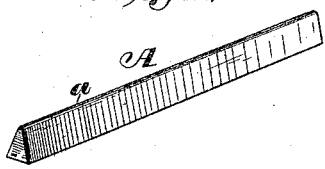

(No Model.)

D. GENESE.
DENTAL SEPARATING WEDGE.

No. 309,709. Patented Dec. 23, 1884.

Witnesses.
Robert Everett,
J. A. Rutherford

Inventor,
David Genese
By James L. Norris.
Atty.

UNITED STATES PATENT OFFICE.

DAVID GENESE, OF BALTIMORE, MARYLAND.

DENTAL SEPARATING-WEDGE.

SPECIFICATION forming part of Letters Patent No. 309,709, dated December 23, 1884.

Application filed October 29, 1884. (No model.)

*To all whom it may concern:*

Be it known that I, DAVID GENESE, a subject of the Queen of Great Britain, residing at Baltimore, Maryland, have invented new and useful Improvements in Appliances for Dental Purposes, of which the following is a specification.

My invention relates to means for separating teeth preparatory to filling the same, and has for its objects to provide an elastic wedge for that purpose which will not soften nor alter its shape by the action of the fluids of the mouth thereon; that will return to its original form as it is allowed to gradually expand, and that will exert a continuous pressure while resuming such form; that will in most cases resist being driven too close to the margin of the gum, and which, when driven close thereto, will not irritate or injure the gum; that can be used to force the gum beyond the neck of the teeth when an "approximal" cavity above the margin of the gum is to be filled; and, among other objects, to provide a series of wedges of consecutive thicknesses, so that when the teeth have been separated to the extent of the thickness of one wedge the same may be removed and the wedge next in order of thickness substituted therefor, so that a patient can apply the necessary wedges till the teeth are separated sufficiently for the operator's purpose.

Before proceeding to describe my invention it may be premised that teeth, being narrower at the neck than at the cutting-edge, wedges heretofore most commonly used for separating the teeth have a tendency to drive or work their way to the margin of the gum, and when such is the case so much pain is produced that it is impossible for some delicate and nervous persons to bear the pain long enough for the teeth to become sufficiently separated to be operated upon, which results in many appointments being broken, and often in a failure of placing a perfect filling in an approximal cavity.

Wedges have been made of wood, but these have to be driven in by force and give considerable pain, and frequently splinter and enter the tissues of the gum, and thus cause severe inflammation. They have also been made of raw or unvulcanized rubber, but that material is unreliable, as the temperature of the mouth causes it to change its shape, and besides being quite plastic or pliable, will at times be forced, by the act of masticating, between the gum and tooth, sometimes on one side and at others on both sides, and thus cause a bad ulcerated gum-margin, which may bleed on the slightest touch, and thus spoil a long operation. Again, no definite shape can be given to such material, because by cutting it it will be compressed or squeezed at the wrong place, and thus have imparted to it some other shape than that of a wedge, and thus defeat the object in view. Another material used for the same purpose is cotton-wool; but that has very little expansible qualities, and has to be packed a little by little until a sufficient wedge is formed to answer for a compress; and if this material should remain in the mouth, say thirty hours, and for a less time in some mouths, it will decompose and cause mischief, as is well known to the profession.

Rubber gas-tubing has also been used for making the wedges; but because of its impurity it should not be put in the mouth of any person. Furthermore, the pigment in it in a short time destroys what elasticity it may possess, and in cutting it to form the wedge the same objection is found to exist as that urged against the raw or unvulcanized rubber.

Wedges made as above described proved so inadequate to the ends in view that a double wedge of steel was devised to act from the palatal and labial surfaces of the tooth by a set-screw; but such application is painful, and by some eminent men in the profession is considered to cause permanent injury to the parts acted upon.

The foregoing is believed to be a fair statement of the art, and I will now proceed to fully describe my invention, which is also illustrated in the accompanying drawings, in which—

Figure 2:
Figure 3:
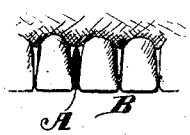
Figure 4:
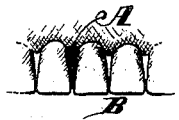
Figure 5:
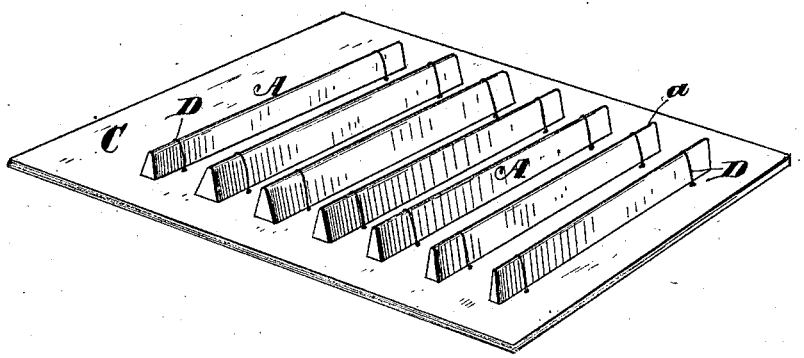

Figure 1 is a perspective view of a single wedge made according to my invention; Fig. 2, a cross-section through the same; Fig. 3, a view illustrating the wedge applied between the teeth with the top edge next to the gum;

Fig. 4, a similar view showing the base of the wedge next to the gum; Fig. 5, a card showing a series of the wedges as formed in consecutive thicknesses for application at different stages of the treatment.

In the drawings, the letter A designates the wedge, B teeth within which it is inserted, and C a pasteboard or other card having a series of wedges of varying thicknesses and arranged in the order of their sizes, secured thereto by means of metallic or other loops, D. These wedges are made of pure rubber or gum vulcanized in steam (not acid-cured) and without sulphur. The rubber thus prepared is next placed in a metal mold, preferably made of steel, and formed with triangular cavities of prolonged length. Enough of the rubber is introduced in any well-known way in molding the same to permit of considerable compression of the same, the quantity depending on the density to be given to the wedge. After the mold is thus filled it is placed in any suitable press and pressure applied sufficient to compress the rubber compactly into the triangular shape of the cavity in the mold, and to give it such density that it will bear and maintain its triangular and resume its original size after it has been distended.

The part of the mold, which will form the top edges, $a$, of the triangular wedge is of such form that it will make the edge smooth throughout its length and rounded in cross-section, so that such edge, when next to the margin of the gums, will present no sharp edge to irritate and inflame the gum.

The mold in which the wedge is molded may have a single cavity or a series, so as to form a number of the wedges at one time. The wedge when taken from the mold will have the form (shown in the drawings) of a compact and yet elastic body, and of such density as to exert considerable pressure when compressed, and to resume in time its original shape or size, and will also have the smooth rounded edge already referred to. By thus molding the wedge the objects in view, and which have been hereinbefore stated, are accomplished, and both sides of the wedge being parallel and true the pressure from the opposite sides will be the same.

By forming a series of the wedges of varying sizes and affixing them to a card, as described, the patient can provide himself with a set, and upon receiving instructions from his dentist can himself apply and change the wedges, as may be necessary in the purposes of the treatment, without the necessity of frequent visits to the dentist.

In applying the wedge it is stretched sufficiently to pass between the teeth with its top edges upward and its base or flat lower face level with the cutting-edge of the teeth. Then its length is shortened by cutting it, so as to leave about one-eighth of an inch front and back of the teeth. It will then by its own force of regaining its original size separate the teeth and work its way to the gum until pressure is no longer exerted, when, if necessary, it may be removed and another next in order of size put in its place. As the wedge will not expand to more than its original size by moisture, the dentist will from the first be enabled to decide the size of wedges to use in rotation, thus avoiding unnecessary division and displacement of the teeth.

Should it be desired to force the gum beyond the neck of the teeth, one of which may have an approximal cavity above the margin of the gum, it is necessary only to present the broad flat surface of the strip upward, when the edges will lie close to the teeth and lift the gum above the cavity without bruising it, and thus make easy what has heretofore been a difficult and painful operation.

Having thus described my invention, what I claim is—

A tooth-separator for dentists, consisting of a molded and vulcanized rubber wedge, substantially as and for the purposes described.

In testimony whereof I affix my signature in presence of two witnesses.

DAVID GENESE.

Witnesses:
G. EVETT REARDON,
CHARLES C. RHODES.